(12) United States Patent
Wright

(10) Patent No.: US 7,060,352 B2
(45) Date of Patent: Jun. 13, 2006

(54) METHOD OF DETACKIFYING AN EDGE FACE OF A ROLL OF TAPE USING A RADIATION CURABLE COMPOSITION

(75) Inventor: Robin E. Wright, Inver Grove Heights, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 893 days.

(21) Appl. No.: 09/808,610

(22) Filed: Mar. 14, 2001

(65) Prior Publication Data

US 2002/0168514 A1 Nov. 14, 2002

(51) Int. Cl.
*B32B 15/04* (2006.01)
*B32B 7/12* (2006.01)

(52) U.S. Cl. ............... 428/343; 428/345; 428/355 AC; 428/355 N; 428/906

(58) Field of Classification Search ................ 428/343, 428/345, 355 AC, 355 N, 906
See application file for complete search history.

(56) References Cited

U.S. PATENT DOCUMENTS

| | | | | |
|---|---|---|---|---|
| 4,151,056 A | * | 4/1979 | Park | 204/159.16 |
| 4,238,269 A | | 12/1980 | Deering, Jr. | 156/456 |
| 4,946,728 A | | 8/1990 | Ikeda et al. | |
| 5,070,121 A | * | 12/1991 | Hinterwaldner et al. | 524/31 |
| 5,118,567 A | * | 6/1992 | Komiyama et al. | 428/345 |
| 5,734,002 A | * | 3/1998 | Reich et al. | 528/53 |
| 5,863,620 A | | 1/1999 | Schäfer | |
| 5,939,161 A | | 8/1999 | Callahan, Jr. et al. | 428/40.1 |

FOREIGN PATENT DOCUMENTS

| | | |
|---|---|---|
| GB | 2073611 | 10/1981 |
| JP | 50-10353 | 4/1975 |
| JP | 50020579 | 7/1975 |
| JP | 59-43083 | 9/1982 |
| JP | 58038776 | 3/1983 |
| JP | 59-159874 | 9/1984 |
| JP | 7-93806 | 10/1996 |
| WO | WO 98/13199 | 4/1998 |

OTHER PUBLICATIONS

Derwent Abstract of JP 60027628 A.*
Concise Encyclopedia of Polymer Science and Engineering, John Wiley & Sons, 1980, p. 728-729.*
Mayzo RA-23 Release Coat product literature Dec. 16, 1996 (2 pages).
Mayzo Material Safety Data Sheet RA-23 Release Coat May 21, 1997 (3 pages).

* cited by examiner

*Primary Examiner*—Victor S. Chang
(74) *Attorney, Agent, or Firm*—David B. Patchett

(57) ABSTRACT

A method of detackifying an edge face of a roll of pressure sensitive adhesive tape, the method including coating an edge face of the roll of tape with a composition comprising acrylate oligomer, and polyetheracrylate oligomer, and curing the composition.

17 Claims, No Drawings

METHOD OF DETACKIFYING AN EDGE FACE OF A ROLL OF TAPE USING A RADIATION CURABLE COMPOSITION

BACKGROUND OF THE INVENTION

The invention relates to detackifying the edge face of a roll of tape.

A roll of pressure sensitive adhesive tape is often prepared by applying a pressure sensitive adhesive composition to a backing and then winding the backing on a cylindrical core to form the roll of tape. The edge face of the roll of tape often includes exposed pressure sensitive adhesive, which renders the edge face tacky. In addition, when the tape is wound upon a cylindrical core to form a roll, uneven winding may occur which may cause variations in the edge face surface Multiple rolls of pressure sensitive adhesive are often packaged in a stack. When rolls of pressure sensitive adhesive tape are stacked on top of one another they tend to block, i.e., stick together. Blocking tends to increase in frequency and degree over time. The edge face of a roll of tape also tends to stick to its packaging, which can make removal of the roll of tape from the packaging difficult. Electrical tape, for example, which is often sold in plastic containers, tends to stick to the plastic walls of the container. The tacky nature of the edge face also tends to attract dust, dirt and other particles from the environment.

A number of methods have been developed to detackify the edge face of a roll of adhesive tape. One common method involves placing a sheet of paper in contact with the edge face, e.g., between two rolls of tape. Another method involves coating the edge face of a roll of tape with very small glass beads. The glass beads, however, tend to fall off of the roll and into the machinery used to manufacture the rolls of tape, which can damage the tape manufacturing machinery. Other methods include applying a detackifying agent to the edge of a strip of tape using a sponge or a cloth. The agent is applied prior to the strip of tape being wound upon a cylindrical core to form a roll.

SUMMARY

In one aspect, the invention features a method of detackifying an edge face of a roll of pressure sensitive adhesive tape, the method including a) contacting an edge face of the roll of tape with a composition comprising acrylate oligomer and polyether acrylate oligomer, and b) curing the composition.

In one embodiment, the composition includes from about 10% to about 40% acrylate oligomer and from about 50% to about 90% polyether acrylate oligomer. In some embodiments, the acrylate oligomer includes polyurethane acrylate. In other embodiments, the polyether acrylate has amine functionality.

In some embodiments, the composition further includes monomer. In one embodiment, the monomer includes an ethylenically unsaturated monomer. In other embodiments, the monomer is selected from the group consisting of ethylene glycol diacrylate, propylene glycol diacrylate, trimethylolpropane triacrylate, 1,6-hexamethylenedioldiacrylate, pentaerythritol diacrylate, pentaerythritol triacrylate, pentaerythritol tetraacrylate, 1,12-dodecanedioldiacrylate and mixtures thereof. In another embodiment, the monomer is selected from the group consisting of lauryl acrylate, stearyl acrylate, isooctyl acrylate, acrylic acid, 2-ethylhexyl acrylate, nonyl acrylate, isobornyl acrylate, ethoxyethoxyethyl acrylate, N-vinyl caprolactam and N-vinyl-2-pyrrolidone, and ethoxylated and propoxylated monomers thereof, and mixtures thereof.

In one embodiment, the composition further includes a matting agent. In some embodiments, the matting agent includes silica.

In other embodiments, the composition further includes silicone acrylate.

In another embodiment, the composition further includes a photoinitiator. In one embodiment, the photoinitiator is selected from the group consisting of α-hydroxy ketones, α-amino ketones, benzildialkyl ketals, acylphosphine oxides, benzophenones and combinations thereof. In some embodiments, the composition further includes an amine synergist.

In other embodiments, when a layer of the roll of tape is unwound from the roll, the coating remains adhered to the layer.

In one embodiment, the curing includes exposing the composition to radiation selected from the group consisting of ultraviolet radiation, electron beam radiation, gamma radiation and combinations thereof.

In some embodiments, the method further includes contacting a second edge face of the roll of tape with a coating composition and curing the composition.

In other embodiments, the method further includes substantially simultaneously contacting the first edge face of the roll of tape and a second edge face of the roll of tape with the coating composition.

In another aspect, the invention features a roll of pressure sensitive adhesive tape that includes a first nontacky edge face, a second edge face, and a coating disposed on the first edge face, the coating including the reaction product of acrylate oligomer, polyether acrylate oligomer, and optionally monomer, photoinitiator or a combination thereof. In one embodiment, the composition includes the reaction product of from about 10% to about 40% acrylate oligomer and from about 50% to about 90% polyether acrylate oligomer. In some embodiments, the acrylate oligomer includes polyurethane acrylate.

In one embodiment, the polyether acrylate includes amine functionality. In other embodiments, the composition includes the reaction product of the acrylate oligomer, the polyether acrylate oligomer and the monomer. In another embodiment, the monomer includes an ethylenically unsaturated monomer. In some embodiments, the monomer is selected from the group consisting of ethylene glycol diacrylate, propylene glycol diacrylate, trimethylolpropane triacrylate, 1,6-hexamethylenedioldiacrylate, pentaerythritol diacrylate, pentaerythritol triacrylate, pentaerythritol tetraacrylate, 1,12-dodecanedioldiacrylate and mixtures thereof. In some embodiments, the monomer is selected from the group consisting of lauryl acrylate, stearyl acrylate, isooctyl acrylate, acrylic acid, 2-ethylhexyl acrylate, nonyl acrylate, isobornyl acrylate, ethoxyethoxyethyl acrylate, N-vinyl caprolactam and N-vinyl-2-pyrrolidone, and ethoxylated and propoxylated monomers thereof, and mixtures thereof.

In some embodiments, the composition further includes a matting agent (e.g., silica).

In other embodiments, the composition further includes silicone acrylate. In some embodiments, the composition includes the reaction product of the acrylate oligomer, the polyether acrylate oligomer and the photoinitiator. In another embodiment, the photoinitiator is selected from the group consisting of α-hydroxy ketones, α-amino ketones, benzildialkyl ketals, acylphosphine oxides, benzophenones and combinations thereof.

In some embodiments, when a layer of the roll of tape is unwound from the roll, the coating remains adhered to the layer.

In other embodiments, the coating is crosslinked.

In one embodiment, the second edge face is nontacky and the tape further includes a coating disposed on the second edge face, the coating including the reaction product of acrylate oligomer, polyether acrylate oligomer and optionally monomer, photoinitiator or a combination thereof.

In other aspects, the invention features a roll of pressure sensitive adhesive tape that includes a first nontacky edge face; a second edge face; and a discontinuous coating disposed on the first edge face, the coating comprising the reaction product of acrylate oligomer, polyether acrylate oligomer and optionally monomer, photoinitiator or a combination thereof.

The detackified rolls of tape can be packaged without significant sticking to packaging materials such as plastic, cardboard and metal. The detackified rolls of tape can also be stacked upon each other edge face to edge face without blocking such that each detackified roll of tape can be easily removed from the stack. Rolls of tape that include the detackifying composition on their edge faces exhibit minimal to no particulate generation upon unwind or during use.

Detackified edge faces of rolls of pressure-sensitive adhesive tape are also less apt to pick up dirt and other contaminates relative to edge faces that have not been detackified.

The coating composition used to detackify the rolls of tape can be formulated to exhibit low odor.

Other features and advantages of the invention will be apparent from the following description of the preferred embodiments thereof, and from the claims.

DETAILED DESCRIPTION

The method of detackifying the edge face of a roll of pressure sensitive adhesive tape includes contacting the edge face of the roll of tape with a composition and curing, i.e., crosslinking, the composition to form a coating. Preferably the cured composition is present on both edge faces of the roll of tape such that the surface of each edge face is nontacky.

The coating on the edge face of the roll of tape is sufficiently thick to detackify the edge of the roll of tape with which it is associated and sufficiently thin such that upon unwind of the exterior layer of tape from the roll of tape, the coating breaks at the interface between the exterior layer of tape and the remainder of the roll, i.e., the coating is frangible. Prior to, during and after unwind of an individual layer of adhesive tape from a roll of tape, the coating remains adhered to the edge of the layer (including, e.g., the backing and the adhesive composition) with which it is associated. Preferably the coating remains adhered to the edge of the layer of tape such that it does not visibly flake, crumble, form particles or otherwise fall off of the edge face of the roll of tape, or in the case of a layer that has been unwound from the roll of tape, the unwound layer.

The coating composition is free-radically curable and includes the reaction product of acrylate oligomer and polyetheracrylate oligomer, and optionally monomer, photoinitiator, and combinations thereof. The uncured composition is coatable at room temperature (about 25° C.) and preferably has a viscosity greater than 50 centipoise (cps), more preferably from about 200 cps to about 1000 cps.

Useful acrylate oligomers include polyester acrylates, polyurethane acrylates, epoxy acrylates, and combinations thereof. Preferred acrylate oligomers include, e.g., aromatic and aliphatic polyurethane acrylates. Useful commercially available aliphatic polyurethane acrylates are available under the trade designations RCC 12-891 and RCC-12892 from Cognis Corp. (Ambler, Pa.), LAROMER UA 19 T from BASF (Charlotte, N.C.), CN 964 from Sartomer Co. (Exton, Pa.), and EBERCYRL 230, EBERCYRL 264, EBERCYRL 265, EBERCYRL 4833 and EBERCYRL 8402 from UCB Chemicals Corp. (Smyrna, Ga.). The acrylate oligomer preferably has a viscosity no greater than about 100,000 cps, more preferably no greater than about 10,000 cps. The coating composition preferably includes acrylate oligomer in an amount from about 10% by weight to about 40% by weight.

Suitable polyetheracrylate oligomers include polyetheracrylate, polyetheracrylates having amine functionality including, e.g., amino-modified polyether acrylates and hydroxylamino-modified polyether acrylates, and combinations thereof. Suitable commercially available polyetheracrylate oligomers are available under the trade designations LAROMER LR 8863, LAROMER PO 43 F and LAROMER 8967 from BASF. Suitable commercially available amine functionalized polyether acrylates are available under the trade designations LAROMER LR 8869, LAROMER LR 8946 and LAROMER PO 94 F from BASF.

Preferably the polyetheracrylate oligomer has a viscosity no greater than about 1000 cps, preferably no greater than about 500 cps, more preferably less than about 200 cps. The coating composition preferably includes polyetheracrylate oligomer in an amount from about 50% by weight to about 90% by weight.

When monomer is present in the uncured coating composition the monomer is preferably ethylenically unsaturated and may be monofunctional or multifunctional or a blend thereof. Suitable monofunctional ethylenically unsaturated monomers include, e.g., lauryl acrylate, stearyl acrylate, isooctyl acrylate, acrylic acid, 2-ethylhexyl acrylate, nonyl acrylate, isobornyl acrylate, ethoxyethoxyethyl acrylate, N-vinyl caprolactam and N-vinyl-2-pyrrolidone, and ethoxylated and propoxylated monomers thereof, and mixtures thereof. Examples of suitable multifunctional ethylenically unsaturated monomers include acrylic monomers including, e.g., ethylene glycol diacrylate, propylene glycol diacrylate, trimethylolpropane triacrylate, 1,6-hexamethylenedioldiacrylate, pentaerythritol di-, tri-, and tetraacrylate and 1,12-dodecanedioldiacrylate, and mixtures thereof. Preferably the uncured coating composition includes monomer in an amount of from about 0% by weight to about 20% by weight, more preferably from about 2% by weight to about 15% by weight.

The composition can optionally include a photoinitiator. Examples of suitable photoinitiators include, e.g., ketone-based photoinitiators including, e.g., benzophenone, benzoin ethers (e.g., benzoin methyl ether and benzoin ispropyl ether), hydroxypropyl phenyl ketone, substituted acetophenones (e.g., 2,2-diethoxyacetophenone, 2,2-dimethoxy-2-phenyl-1-phenylethanone, dimethoxyhydroxyacetophenone, 2-hydroxy-2-methylphenylpropan-1-one, m-chloroacetophenone), propiophenone, benzil, benzildialkyl ketals, anthraquinone, thioxanthone, thioxanthone derivatives, acylphosphine oxides and substituted α-ketols (e.g., 2-methyl-2-hydroxy propiophenone), and mixtures thereof including, e.g., mixtures of benzildialkyl ketals and benzophenones.

Useful commercially available photoinitiators include α-hydroxy ketones available under the trade designations IRGACURE 184, DAROCUR 1173, IRGACURE 2959 and IRGACURE 1000 from Ciba Specialty Chemicals (Tarrytown, N.Y.), α-amino ketones available under the trade designations IRGACURE 907, IRGACURE 369 and IRGACURE 1300 from Ciba, benzildialkyl ketals available under the trade designations Irgacure 651 from Ciba, and KB-1 from Sartomer, acylphosphine oxides available under the trade designations IRGACURE 819, IRGACURE 700, IRGACURE 1800, IRGACURE 1850 and IRGACURE 4265 from Ciba and LUCIRIN TPO and LUCIRIN TPO-L from BASF, and benzophenones available under the trade designations DAROCUR BP from Ciba. Other useful commercially available photoinitiators include polymeric photoinitiators available under the trade designations KIP 150 F and KIP 100 F from Sartomer.

The photoinitiator can be present in the composition in an amount from 0% by weight to about 5% by weight, preferably from about 0.01% by weight to about 3.0% by weight, more preferably from about 0.1% by weight to about 2.0% by weight based upon the weight of the oligomer mixture.

The composition can also include an amine synergist. Useful amine synergists include reactive tertiary amines including, e.g., dibutylaminoethanol amine, triethanol amine and methyldiethanol amine. Useful amine synergists are commercially available under the trade designations LAROMER LR 8956 from BASF and TEOA from Dow Chemical (Midland, Mich.), and reactive amine co-initiators commercially available under the trade designations CN 383 and CN 384 from Sartomer.

A matting agent can also be added to the composition. One example of a suitable matting agent is fumed silica.

The composition can also include functionalized silicone including, e.g., silicone acrylates (e.g., acrylated polysiloxanes). Suitable functionalized silicones are commercially available, for example, under the trade designations EBERCRYL 350 and EBERCRYL 4842 from UCB Chemicals and PERENOL S-5 modified silicones from Cognis. Useful acrylated polysiloxanes are commercially available under the trade designations RC711 and RC709 from Goldschmidt Chemical Corp. (Hopewell, Va.).

The free-radically polymerizable composition can further include additional ingredients including, e.g., ultraviolet light absorbers, light stabilizers, fillers, pigments, flow aids, defoamers, surfactants, and combinations thereof.

The coating composition and the coating weight applied to the edge face of the roll of tape to be detackified are selected based upon a variety of factors related to the roll of tape including, e.g., the adhesive composition, the coating weight of the adhesive composition and the backing of the roll of tape. The coating weight applied to the edge face of the roll of tape is preferably sufficiently great to detackify the edge face and to provide a coating on the edge face, yet sufficiently small to provide a friable coating. The coating weight can also be varied depending upon the surface variations present on the edge face. The coating weight is preferably from about 4.5 g/m$^2$ to about 70 g/m$^2$. The coating composition can be applied to the edge face of a roll of tape using a variety of methods including, e.g., contacting the edge face with a cloth, sponge or brush, roll coating, spray coating and dip coating. The coating on the edge face of the roll of tape is preferably continuous but can be applied as a continuous or discontinuous coating including, e.g., a pattern (e.g., dots or stripes).

The composition can be cured by exposing the composition to radiation including, e.g., ultraviolet radiation, electron beam radiation, thermal radiation and combinations thereof.

The detackified edge face of a roll of tape preferably is sufficiently nontacky such that the edge faces of the roll of tape do not stick to materials in which the roll is packaged and when multiple detackified rolls are stacked on top of each other edge face to edge face they do not block, i.e., stick together. Preferably the rolls have been detackified such that individual rolls of tape can be separated from one another after having been placed in a stack of 6 rolls for a period of at least 7 days at 32° C., more preferably after 7 days at 43° C., most preferably after 7 days at 50° C.

The tape includes a pressure sensitive adhesive tape disposed on a backing and is wound upon itself in the form of a roll of tape. Useful tape backings include backings, release liners, release coated materials and combinations thereof. Examples of useful tape constructions include polymeric film, paper, metal foil, foam, reinforced, double-faced and transfer tape. Other useful tape constructions include composite backings, composite liners, multi-layer backings and combinations thereof.

Examples of useful tape backings include cellophane, acetate, fiber, polyester, vinyl, polyethylene, polypropylene including, e.g., monoaxially oriented polypropylene and biaxially oriented polypropylene, polytetrafluoroethylene, polyvinylfluoroethylene, polyurethane, polyimide, paper (e.g., kraft paper), woven webs (e.g., cotton, polyester, nylon and glass), nonwoven webs, foil (e.g., aluminum, lead, copper, stainless steel and brass foil tapes) and combinations thereof. The roll of tape can include a release liner in addition to the backing.

Examples of useful release liners include papers, polymeric film, and woven and nonwoven fabric. The release liner can include a release coating composition including, e.g., silicone, fluorocarbons, carbamate and polyolefins including, e.g., polyethylene and polypropylene.

Backings and, when present, release liners can also include reinforcing agents including, e.g., fibers, filaments (e.g., glass fiber filaments), and saturants, e.g., synthetic rubber latex saturated paper backings.

Common tape types that can be detackified include masking tape, electrical tape, duct tape, filament tape, medical tape, and rolls of tape that are commercially available under the trade designation SCOTCH MAGIC MENDING Tape from Minnesota Mining and Manufacturing (St. Paul, Minn.).

The method is particularly useful for detackifying the edge face of a roll of tape that includes a pressure sensitive adhesive composition. The roll of tape may include pressure sensitive adhesive compositions that include, e.g., natural rubber, polyisobutylene, styrene butadiene rubber, polyacrylate, styrene-isoprene-styrene copolymers, styrene-butadiene-styrene copolymers, polyisobutylene, polyisoprene, polyurethane and polyvinyl ethyl ether.

The coating composition can be heated to alter the viscosity of the coating composition, which can alter the coatability and applied coating weight.

The coating composition can be cured in air and in inert environments including, e.g., under nitrogen.

The invention will now be described further by way of the following examples. All parts, ratios, percents and amounts stated in the Examples are by weight unless otherwise specified.

EXAMPLES

Test Procedures

Test procedures used in the examples include the following.

Detack Test Method

The presence of tack on the edge face of a roll of tape that has been coated with the coating composition is determined by contacting the cotton end of a cotton-tipped applicator to the coated surface for several seconds and then removing the applicator. The absence of cotton fibers on the coated surface indicates that the edge face is detackified.

Heat Aging Test Method

A package is prepared by stacking 6 sample rolls of tape edge face to edge face. A 10 lb. weight is placed on top of the stack. The package is placed in an oven at 50° C. for two weeks. The package is then removed from the oven and an attempt is made to separate the rolls from each other. If the rolls of tape can be easily separated from each other by hand, the sample is recorded as a "pass." If the rolls of tape require a force greater than about 1 Kg to separate one from another, the sample is recorded as a "fail."

Example 1

A coating composition was prepared by combining, with mixing, 5.25 g RCC 12-891 aliphatic urethane acrylate (Cognis, Ambler, Pa.), 11.64 g LAROMER PO 94 F amine functionalized polyether acrylate (BASF, Charlotte, N.C.), 3.29 g SR610 polyethylene glycol (Sartomer Co., Exton, Pa.), 0.2 g KB-1 photoinitiator (Sartomer), 0.2 g benzophenone flake (Sartomer) and 0.4 g EBERCRYL 350 silicone acrylate (UCB Chemicals, Smyrna, Ga.). The blend was warmed slightly in a microwave oven to facilitate dissolution of the solid components and then allowed to equilibrate at room temperature.

A small volume of the composition was spread onto a portion of one edge of a roll of Scotch™ Super 33+ vinyl electrical tape (Minnesota Mining and Manufacturing Company, St. Paul, Minn.) using a KIMWIPE EX-L wipe (Kimberly-Clark, Roswell, Ga.) to provide a thin coating on the edge of the roll of tape. The coating was then passed at 30.3 m/min. under a 120 Watt/cm microwave-driven mercury UV light source (Fusion UV Systems, Gaithersburg, Md.).

The surface of the exposed surface was rubbed with a KIMWIPE to verify cure. Detack of the edge face was tested using the cotton-tipped applicator test method. A comparison of the uncoated portion of the tape roll edge resulted in the transfer of cotton fibers from the applicator to the adhesive.

Example 2

A coating composition was prepared by adding 1.3 g SYLOID 7000 silica (W. R. Grace, Baltimore, Md.) to 20 g of a composition prepared following the procedure of Example 1. The mixture was allowed to mix on a rolling stand for 24 hours.

When coated and cured onto a portion of the edge of a tape roll using the procedure described in Example 1, the surface was found to be detackified. There was also a visible decrease in the gloss level of the coated surface.

Example 3

The coating composition of Example 1 was coated on the edge of a roll of masking tape (Minnesota Mining and Manufacturing Company, St. Paul, Minn.). Coated areas of the edge face of the roll of tape showed no affinity for cotton fibers when tested using the Detack Test Method. Cotton fibers readily transferred to uncoated areas of the edge face of the roll of tape.

Examples 4a–4c

The edge faces of rolls of filament tape (Examples 4a and 4b) and duct tape (Example 4c) were coated with the coating composition of Example 2. The core diameter and the outside diameter of the rolls of tape and the coating weight applied to the edge face of the rolls of tape are set forth in Table 1.

The coated edge faces of the rolls of tape of Examples 4a–4d showed no affinity for cotton fibers when tested using the Detack Test Method.

Control 1

Control 1 was a roll of filament tape identical in to the rolls of Examples 4a and 4b with the exception that the edge faces of the rolls were not coated with a coating composition.

A stack of six rolls of each of the rolls of tape of Examples 4a–4c and Control 1 were tested according to the Heat Aging Test Method. The rolls of tape of Examples 4a–4c were easily pulled apart by hand and recorded as a "pass." The stack of rolls of Control 1 tape could not be easily pulled apart by hand and were recorded as a "fail."

TABLE 1

| Sample | Tape | Core Diameter (cm) | Outside Diameter (cm) | Coat Weight (g/m$^2$) | Heat Aging Test |
|---|---|---|---|---|---|
| Control 1 | Filament Tape | 76.2 | 133.35 | 0 | Fail |
| Example 4a | Filament Tape | 76.2 | 133.35 | 10.63 | Pass |
| Example 4b | Filament Tape | 76.2 | 133.35 | 22.0 | Pass |
| Example 4c | Duct Tape | 76.2 | 152.4 | 22 | Pass |

Examples 5a–5c

Rolls of tape having constructions set forth in Table 2 were coated with the coating composition of Example 2 according to the method of Example 4.

The coated edge faces of the rolls of tape of Examples 5a–5c showed no affinity for cotton fibers when tested using the Detack Test Method.

Control 2

Control 2 was a roll of electrical tape identical in construction to the rolls of tape of Examples 5a and 5b with the exception that the edge faces of the roll of tape of Control 2 were not coated with a coating composition.

Control 3

Control 3 was a roll of duct tape identical in construction to the roll of tape of Example 5c with the exception that the edge faces of the roll of tape of Control 3 were not coated with a coating composition.

A 2.54 cm radius steel sphere was pushed into the edge face of the rolls of tape of Examples 5a–c and Controls 2 and 3 with a nominal load of 455 g. The force required to remove the sphere from the edge face of the roll of tape was measured. The results are set forth in Table 2.

TABLE 2

| Example | Tape | Core Diameter (cm) | Outside Diameter (cm) | Coat Weight g/m² | Adhesion Force (g) Initial | Adhesion Force (g) Heat Aged |
|---|---|---|---|---|---|---|
| Control 2 | Electrical Tape | 25.4 | 76.2 | 0 | 90 | 170 |
| Example 5a | Electrical Tape | 25.4 | 76.2 | 7.3 | 3 | 41 |
| Example 5b | Electrical Tape | 25.4 | 76.2 | 13.6 | 8 | 80 |
| Control 3 | Duct Tape | 76.2 | 152.4 | 0 | 90.2 | NT |
| Example 5c | Duct Tape | 76.2 | 152.4 | 25.1 | 1.2 | NT |

NT = Not Tested

Examples 6a–f

The edge faces of rolls of tape having the constructions set forth in Table 3 were coated with the coating composition of Example 2 according to the method of Example 4.

The coated edge faces of the rolls of tape of Examples 6a–6d showed no affinity for cotton fibers when tested using the Detack Test Method.

Control 4

Control 4 was a roll of filament tape identical in construction to the roll of tape of Examples 6a and 6b with the exception that the edge faces of the roll of tape of Control 4 were not coated with a coating composition.

Control 5

Control 5 was a roll of masking tape identical in construction to the roll of tape of Examples 6c and 6d with the exception that the edge faces of the roll of tape of Control 5 were not coated with a coating composition.

Control 6

Control 6 was a roll of electrical tape identical in construction to the roll of tape of Examples 6e and 6f with the exception that the edge faces of the roll of tape of Control 6 were not coated with a coating composition.

Stacks of six rolls of each of the rolls of tape of Examples 6a–6f and Controls 4–6 were prepared. A 10 lb weight was placed on each stack and placed in an oven at 50° C. for one week. The 10 lb weight was removed and the stack was placed in an Instron force measuring device (Instron Corp., Canton, Mass.) and the force required to pull the rolls apart was measured in kilograms (Kg). The results are reported in Table 3.

TABLE 3

| Example | Tape | Core Diameter (cm) | Outside Diameter (cm) | Coat Weight (g/m²) | Force required to separate the rolls (Kg) |
|---|---|---|---|---|---|
| Control 4 | Filament Tape | 76.2 | 133.35 | 0 | 28.57 |
| Example 6a | Filament Tape | 76.2 | 133.35 | 12.55 | 0.91 |
| Example 6b | Filament Tape | 76.2 | 133.35 | 22.00 | 0.00 |
| Control 5 | Masking Tape | 76.2 | 133.35 | 0.00 | 14.97 |
| Example 6c | Masking Tape | 76.2 | 133.35 | 19.13 | 0.91 |
| Example 6d | Masking Tape | 76.2 | 133.35 | 40.40 | 0.00 |
| Control 6 | Electrical Tape | 25.4 | 76.2 | 0.00 | 15.87 |
| Example 6e | Electrical Tape | 25.4 | 76.2 | 9.00 | 5.90 |
| Example 6f | Electrical Tape | 25.4 | 76.2 | 15.00 | 3.63 |

Other embodiments are within the following claims.

What is claimed is:

1. A roll of pressure sensitive adhesive tape comprising
   a first nontacky edge face;
   a second edge face opposite said first edge face; and
   a coating disposed on said first edge face, said coating comprising the reaction product of
   a) acrylate oligomer;
   b) polyetheracrylate oligomer; and
   c) optionally monomer, photoinitiator or a combination thereof.

2. The roll of pressure sensitive adhesive tape of claim 1, wherein said composition comprises the reaction product of
   a) from about 10% to about 40% acrylate oligomer, and
   b) from about 50% to about 90% polyetheracrylate oligomer.

3. The roll of pressure sensitive adhesive tape of claim 1, wherein said acrylate oligomer comprises polyurethane acrylate.

4. The roll of pressure sensitive adhesive tape of claim 1, wherein said polyetheracrylate comprises amine functionality.

5. The roll of pressure sensitive adhesive tape of claim 1, wherein said composition comprises the reaction product of said acrylate oligomer, said polyether acrylate oligomer and said monomer.

6. The roll of pressure sensitive adhesive tape of claim 5, wherein said monomer comprises an ethylenically unsaturated monomer.

7. The roll of pressure sensitive adhesive tape of claim 5, wherein said monomer is selected from the group consisting of ethylene glycol diacrylate, propylene glycol diacrylate, trimethylolpropane triacrylate, 1,6-hexamethylenedioldiacrylate, pentaerythritol diacrylate, pentaerythritol triacrylate, pentaerythritol tetraacrylate, 1,12-dodecanedioldiacrylate and mixtures thereof.

8. The roll of pressure sensitive adhesive tape of claim 5, wherein said monomer is selected from the group consisting of lauryl acrylate, stearyl acrylate, isooctyl acrylate, acrylic acid, 2-ethylhexyl acrylate, nonyl acrylate, isobornyl acrylate, ethoxyethoxyethyl acrylate, N-vinyl caprolactam and N-vinyl-2-pyrrolidone, and ethoxylated and propoxylated monomers thereof, and mixtures thereof.

9. The roll of pressure sensitive adhesive tape of claim 1, wherein said composition further comprises a matting agent.

10. The roll of pressure sensitive adhesive tape of claim 9, wherein said matting agent comprises silica.

11. The roll of pressure sensitive adhesive tape of claim 1, wherein said composition further comprises silicone acrylate.

12. The roll of pressure sensitive adhesive tape of claim 1, wherein said composition comprises the reaction product of said acrylate oligomer, said polyether acrylate oligomer and said photoinitiator.

13. The roll of pressure sensitive adhesive tape of claim 1, wherein said photoinitiator is selected from the group consisting of α-hydroxy ketones, α-amino ketones, benzildialkyl ketals, acylphosphine oxides, benzophenones and combinations thereof.

14. The roll of pressure sensitive adhesive tape of claim 1, wherein when a layer of said roll of tape is unwound from said roll, said coating remains adhered to said layer.

15. The roll of pressure sensitive adhesive tape of claim 1, wherein said coating is crosslinked.

16. The roll of pressure sensitive adhesive tape of claim 1, wherein said second edge face is nontacky, said tape further comprising a coating disposed on said second edge face, said coating comprising the reaction product of
   a) acrylate oligomer;
   b) polyetheracrylate oligomer; and
   c) optionally monomer, photoinitiator or a combination thereof.

17. A roll of pressure sensitive adhesive tape comprising
a first nontacky edge face;
a second edge face opposite said first edge face; and
a discontinuous coating disposed on said first edge face, said coating comprising the reaction product of
   a) acrylate oligomer;
   b) polyetheracrylate oligomer; and
   c) optionally monomer, photoinitiator or a combination thereof.

* * * * *